UNITED STATES PATENT OFFICE.

OSCAR G. DOEBNER, OF BERLIN, PRUSSIA, GERMAN EMPIRE.

IMPROVEMENT IN GREEN COLORING-MATTERS.

Specification forming part of Letters Patent No. 222,257, dated December 2, 1879; application filed February 13, 1879.

*To all whom it may concern:*

Be it known that I, Dr. OSCAR GUSTAV DOEBNER, of Berlin, Prussia, German Empire, have invented a new and Improved Process of Producing Green Coloring-Matters, of which the following is a specification.

The present invention consists in the production of a green coloring-matter by the action of benzotrichloride (the trichloride of benzole) on dimethyl-aniline in the presence of metallic chlorides, such as chloride of zinc, cadmium, tin, copper, mercury, iron, &c., being suitable for dyeing and printing purposes.

Under the name of benzotrichloride is to be understood the substance to which chemists give the formula $C_6H_5CCl_3$, having an average boiling-point of about 215° Celsius, and which is obtained by treating the vapors of toluol or chloride of benzyle with chlorine.

Dimethyl-aniline yields, by the action of benzotrichloride in presence of metallic chlorides, green coloring-matters, which dye in shades similar to methyl-green, although they are not identical with the latter, and also differ in their resistance to higher temperatures. The presence of metallic chlorides is not absolutely necessary for the production of smaller quantities of the coloring-matter, as benzotrichloride and dimethyl-aniline alone, if heated together, already yield a green product; but, for a production on a manufacturing scale and for a perfect conversion, the addition of a chloride is needed.

For producing the coloring-matter three parts of dimethyl-aniline, two parts of benzotrichloride, and one and a half part of dry chloride of zinc are heated in an enameled vessel to a temperature of about 110° Celsius, the mass being kept constantly stirred.

The product obtained is treated with direct steam to distil over all volatile substances, and the residue, which is the green coloring-matter desired, is then extracted by means of boiling-water. The solution thus obtained is then filtered, and a sufficient quantity of chloride of sodium is added to this filtered solution for precipating the coloring-matter therefrom. The precipitate, after it dries and crystallizes, is ready for dyeing and printing purposes by dissolving it in water or in spirit.

In working on a large scale it is advantageous to moderate the very energetic action which occurs on heating the above-named substances together, by adding powdered or liquid substances, like sand, salt, or hydrocarbons, which serve to dilute without exerting any chemical action on the product obtained. The proportions above mentioned will of course undergo a slight change, as a large quantity of coloring-matter is being produced.

I desire it to be understood that my green coloring-matter to which is applied the term "malachite-green" may be easily distinguished from the so-called "methyl-green" or "iodine-green," principally because my product when exposed to high temperatures is not converted into violet, like the green pigments just mentioned.

Having thus described my invention, I claim as new—

A green coloring-matter suitable for dyeing and printing purposes produced by the action of benzotrichloride on dimethyl-aniline, substantially as and for the purpose set forth.

In testimony whereof I have signed my name to this specification in the presence of two subscribing witnesses.

DR. OSCAR GUSTAV DOEBNER.

Witnesses:
 JOHANN BRANDT,
 EDWARD P. MACLEAN.